United States Patent
Erhart et al.

(10) Patent No.: US 7,933,836 B2
(45) Date of Patent: Apr. 26, 2011

(54) PROXY-BASED, TRANSACTION AUTHORIZATION SYSTEM

(75) Inventors: George William Erhart, Loveland, CO (US); Valentine C. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 253 days.

(21) Appl. No.: 12/242,475

(22) Filed: Sep. 30, 2008

(65) Prior Publication Data

US 2010/0082484 A1    Apr. 1, 2010

(51) Int. Cl.
G06Q 40/00    (2006.01)
(52) U.S. Cl. .......................................... 705/44; 705/30
(58) Field of Classification Search ............... 705/10–45
See application file for complete search history.

(56) References Cited

U.S. PATENT DOCUMENTS

| | | | |
|---|---|---|---|
| 5,857,152 A | 1/1999 | Everett | |
| 5,959,568 A | 9/1999 | Woolley | |
| 6,612,488 B2 | 9/2003 | Suzuki | |
| 6,804,606 B2 | 10/2004 | Jones | |
| 6,845,362 B2 | 1/2005 | Furuta et al. | |
| 6,915,205 B2 | 7/2005 | Kim et al. | |
| 7,065,244 B2 | 6/2006 | Akimov et al. | |
| 7,212,806 B2 | 5/2007 | Karaoguz | |
| 2002/0042266 A1 | 4/2002 | Heyward et al. | |
| 2002/0045971 A1 | 4/2002 | Banas | |
| 2004/0004117 A1 | 1/2004 | Suzuki | |
| 2004/0078332 A1* | 4/2004 | Ferguson et al. ............... 705/41 |
| 2004/0082296 A1 | 4/2004 | Twitchell, Jr. | |
| 2005/0222999 A1 | 10/2005 | Nihei | |
| 2006/0258367 A1 | 11/2006 | Chiang et al. | |
| 2006/0276960 A1 | 12/2006 | Adamczyk et al. | |
| 2007/0073585 A1* | 3/2007 | Apple et al. ..................... 705/14 |

(Continued)

FOREIGN PATENT DOCUMENTS

WO    9812504 A1    3/1998

(Continued)

OTHER PUBLICATIONS

Jedermann et al., "Transport Scenario for the Intelligent Container", "Understanding Autonomous Cooperation & Control in Logistics XP009129863", 2007, pp. 393-404, Publisher: Springer, Berlin.

(Continued)

Primary Examiner — Frantzy Poinvil
(74) Attorney, Agent, or Firm — DeMont & Breyer, LLC

(57) ABSTRACT

A system is disclosed that features a transport vehicle in which a responsive object is present, such as a truck in which a cellphone is present, in which the object is equipped to provide location or other state information when queried. The transport vehicle is outfitted with a proxy that represents the responsive object. The proxy is configured such that it is better able than the responsive object to estimate the responsive object's location or state. The vehicle is also outfitted with i) sensors that detect the responsive object and ii) sensors that detect state information of the vehicle. The object sensors are able to query the object in the same way as the querying device would query that object in the prior art. Using information from the sensors, the proxy then responds to the query on behalf of the responsive object, and an authentication device processes the query.

20 Claims, 3 Drawing Sheets

U.S. PATENT DOCUMENTS

| | | |
|---|---|---|
| 2007/0225912 A1 | 9/2007 | Grush |
| 2008/0083826 A1 | 4/2008 | Henry et al. |
| 2008/0119160 A1 | 5/2008 | Adriantsiferana et al. |
| 2008/0143484 A1 | 6/2008 | Twitchell |
| 2008/0143516 A1 | 6/2008 | Mock et al. |
| 2008/0167896 A1 | 7/2008 | Fast et al. |
| 2008/0174485 A1 | 7/2008 | Carani et al. |
| 2008/0231448 A1 | 9/2008 | Fowler et al. |

FOREIGN PATENT DOCUMENTS

| | | |
|---|---|---|
| WO | 02073546 A2 | 9/2002 |
| WO | 2005045718 A1 | 5/2005 |
| WO | 2008151438 A1 | 12/2008 |

OTHER PUBLICATIONS

Krafft, Gerald, "EP Application No. 09171160.6 Office Extended European Search Report Mar. 1, 2010", , Publisher: EPO, Published in: EP.

Schilit et al., "Context-Aware Computing Applications", "IEEE Workshop on Mobile Computing Systems and Applications", Dec. 8-9, 1994, Published in: US.

Abowd et al., "Cyberguide: A Mobile Context-Aware Tour Guide", Sep. 23, 1996, Publisher: Baltzer Journals, Published in: US.

Cheverst et al., "Developing a Context-aware Electronic Tourist Guide: Some Issues and Experiences", , Publisher: Mulitimedia Research Group, Published in: UK.

Cheverst et al., "Sharing (Location) Context to Facilitate Collaboration Between City Visitors", , Publisher: Multimedia Research Group, Published in: UK.

Chen, et al, "A Survey of Context-Aware Mobile Computing Research", "Dartmouth Computer Science Technical Report", Nov. 2000, pp. 1-16, vol. TR2000, No. 381, Published in: U.S.

Hole, Andrew, "GB Application No. 0822854.6 Search Report", Apr. 16, 2009, Publisher: IPO, Published in: GB.

McWhirter, David, "GB Application No. 0822852.0 Search Report", Mar. 31, 2009, Publisher: UK IPO, Published in: GB.

Griffiths, Gareth, "GB Application No. GB0913222.6 Search Report Oct. 30, 2009", , Publisher: UK IPO, Published in: GB.

Joseph, Tonya S., "U.S. Appl. No. 12/328,620 Office Action Aug. 19, 2010", , Publisher: USPTO, Published in: US.

Joseph, Tonya S., "U.S. Appl. No. 12/328,620 Office Action Jan. 7, 2011", , Publisher: USPTO, Published In: US.

* cited by examiner

PROXY-BASED, TRANSACTION AUTHORIZATION SYSTEM

FIELD OF THE INVENTION

The present invention relates to of telecommunications in general, and, more particularly, to a proxy-based, transaction authorization system.

BACKGROUND OF THE INVENTION

Each year, credit card companies lose significant amounts of money due to credit card fraud in cases where thieves use stolen credit cards to enter into fraudulent credit card transactions. The number of such fraudulent transactions can greatly be reduced through the use of authentication methods for ascertaining that the requester of a credit card transaction is, in fact, the owner of the credit card.

A first approach that is used to enhance the security of credit cards comprises demanding the signature of the requester and comparing it to the signature on the back of the credit card. However, this method is inefficient because it requires the exercise of a high degree of scrutiny by the sales clerks responsible for the signature verification. Such degree of scrutiny is often unattainable due to a variety of factors, such as the large number of signatures the clerks have to compare each day.

A second approach to enhance the security of credit card transactions is to associate a cell phone or another "responsive object," which is a portable object that is capable of providing location information about itself when queried, with a credit card owner and then to compare the location of the object—and, therefore, of the collocated credit card owner—with the location of the point-of-sale terminal every time a credit card transaction is requested.

This approach can be very effective when the responsive object has the necessary signal reception to be able to determine its location, such as when the object is able to detect multiple Global Positioning System (GPS) satellites. However, when the responsive object is in a place where it is unable to receive location-related signals, such as inside a motor vehicle, the approach can fail. Similarly, the approach can also fail in situations where the location-tracking service is unavailable due to it being disabled or lacking coverage in the particular area where the point-of-sale terminal is located.

Therefore, the need exists for an improvement in the ability to monitor and report on the location of a responsive object, as well as on addition state-related information of the object, without some of the disadvantages in the prior art.

SUMMARY OF THE INVENTION

Some embodiments of the present invention provide a mechanism for monitoring the state of responsive objects, including their locations, and for the use of the state information during an authorization of a transaction, without some of the costs and disadvantages of techniques in the prior art. For the purposes of this specification, a "responsive object," and its inflected forms, is defined as a portable object, such as a cellular phone or a cargo unit, which is capable of responding to an inquiry about itself, such as a location- or authentication-related query, having been outfitted with one or more sensors, a radio, and associated electronics.

In accordance with the illustrative embodiment, a vehicle in which one or more responsive objects are present is outfitted with a proxy that represents the responsive objects that are present. The proxy is configured such that it is better able than the responsive objects to receive position-determining signals from one or more Global Positioning System satellites, or from another position-determining source. In some embodiments, the proxy is also configured such that it is better able than the responsive objects to receive inquiry signals from a querying device and is therefore able to represent those objects. The vehicle is also outfitted with i) one or more sensors that detect the responsive objects that are present at the vehicle and ii) one or more sensors that detect state information of the vehicle. Both sets of sensors provide information to the proxy. In some embodiments, the responsive-object sensors are able to query each responsive object in the same way that the querying device queries those objects in the prior art. The state of the vehicle can comprise, but is not limited to, one or more of the vehicle's location, its destination, its weight, and one or more environmental conditions inside and/or outside the vehicle such as temperature, humidity, and barometric pressure.

Also as part of the illustrative embodiment, transaction terminals, such as automatic teller machines (ATM) and point-of-sale (POS) terminals, are outfitted with a similar array of sensors along with hardware and software for transmitting their states as determined by data obtained from the sensors. In some alternative embodiments, those terminals make their states available through other means. Every time a transaction is initiated at the transaction terminals, a request is sent to a transaction validator to authenticate the initiator of the transaction and to authorize the transaction. The transaction validator makes an inquiry to the responsive object and the transaction terminal (if needed) to obtain information about their individual states. When the state information is available from both the object and terminal, the validator authorizes the transaction based on the two sets of state information (i.e., from the proxy or responsive object and from the transaction terminal) comparing favorably. Although the illustrative embodiment features the comparison of proxy/responsive object location to the terminal's location, it will be clear to those skilled in the art, after reading this specification, how to make and use alternative embodiments in which additional or different aspects of state information (e.g., environmental condition, etc.) are compared for the purposes of authentication.

When an inquiry is directed to a responsive object in the vehicle by the transaction validator, the proxy detects the inquiry, computes the vehicle's geo-location, and responds with the vehicle's location and/or other state information, in contrast to the responsive object determining and providing its own geo-location. Advantageously, this enables the validator to perform authentication when the responsive object is incapable, temporarily or otherwise, of determining its state information or of communicating with the validator, or both.

The illustrative embodiment comprises: a first responsive object that is capable of determining its geo-location and of responding to a first inquiry by providing a first location datum that represents the geo-location determined; a first sensor for detecting when the first responsive object is within a predetermined vehicle; a second sensor for sensing the geo-location of the predetermined vehicle; and a proxy for responding to the first inquiry when the first responsive object is detected as being within the predetermined vehicle, wherein the proxy responds to the first inquiry by providing the first location datum, and wherein the value of the first location datum is based on the geo-location of the predetermined vehicle.

DETAILED DESCRIPTION

Figure 1:
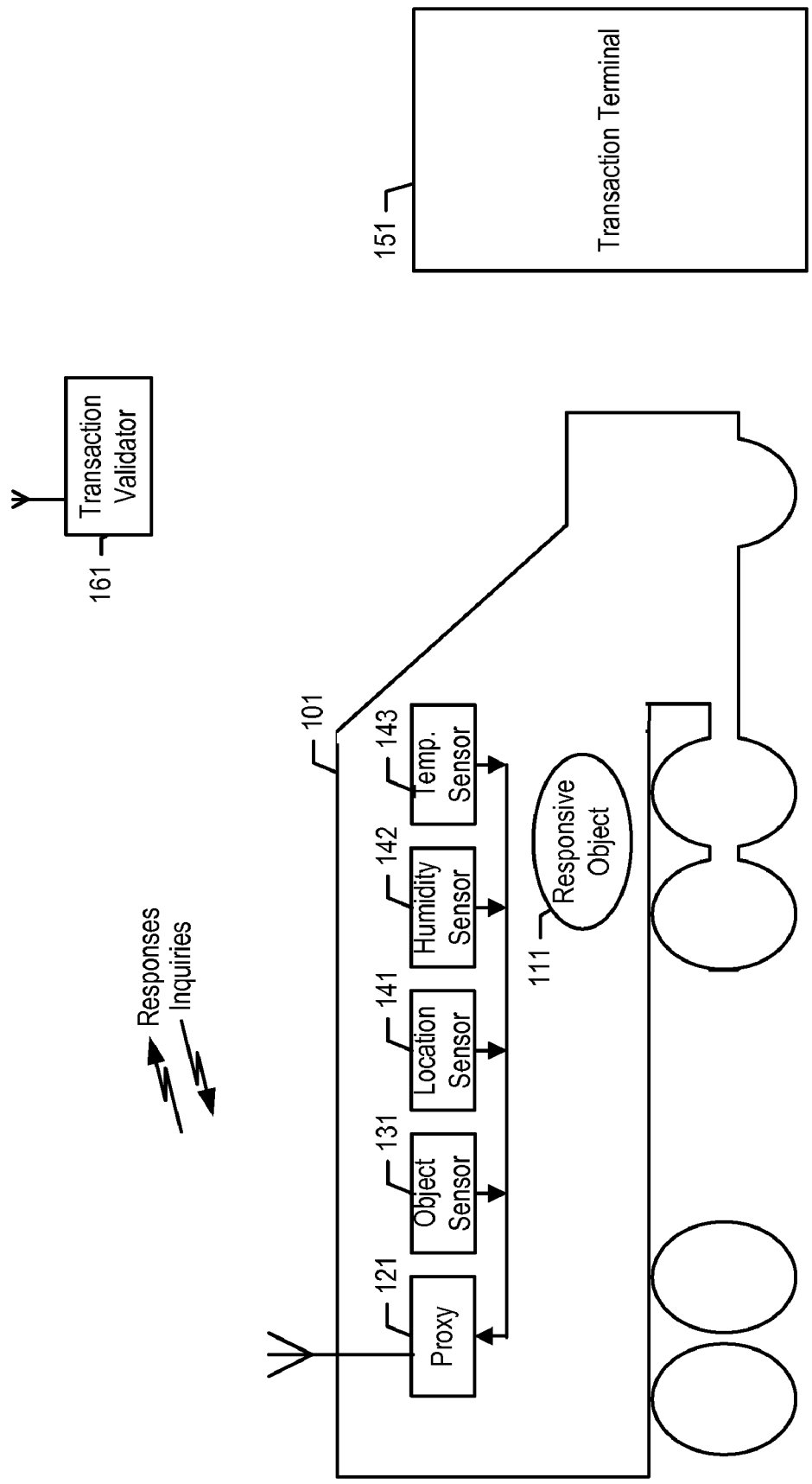
FIG. 1 depicts a schematic diagram of the salient components of authentication system 100 in accordance with the illustrative embodiment of the present invention.

FIG. 1 depicts a schematic diagram of the salient components of authentication system 100 in accordance with the illustrative embodiment of the present invention. Authentication system 100 comprises: vehicle 101, responsive object 111, responsive-object sensor 131, location sensor 141, humidity sensor 142, temperature sensor 143, transaction terminal 151, and transaction validator 161, interrelated as shown.

The illustrative embodiment as disclosed herein comprises certain features, yet many variations of what is disclosed are possible. First, in accordance with the illustrative embodiment, proxy 121 is within vehicle 101 (e.g., inside the trailer, etc.). However, it will be clear to those skilled in the art, after reading this disclosure, how to make and use alternative embodiments of the present invention in which proxy 121 is external to vehicle 101. For example, proxy 121 can serve multiple vehicles while either being attached to the outside of vehicle 101 or not being attached to vehicle 101 at all. Second, in accordance with the illustrative embodiment, vehicle 101 comprises a single responsive object, but it will be clear to those skilled in the art, after reading this disclosure, how to make and use alternative embodiments of the present invention that comprise any number of responsive objects. Third, in accordance with the illustrative embodiment, vehicle 101 comprises one humidity sensor, one temperature sensor, and one location sensor. However, it will be clear to those skilled in the art, after reading this disclosure, how to make and use alternative embodiments of the present invention that comprise any number of location sensors, as well as any number and kind of environmental sensors, such as barometric sensors, light sensors, gravimetric sensors, and so forth.

Vehicle 101 is a truck in which responsive object 111 is present. In accordance with the illustrative embodiment, vehicle 101 is a truck, but it will be clear to those skilled in the art, after reading this disclosure, how to make and use alternative embodiments of the present invention in which vehicle 101 is another type of transportation such as a van, another type of automobile, a ship, an airplane, a train, and so forth. In any case, it will be clear to those skilled in the art how to make and use vehicle 101.

Responsive object 111, as is known in the art, comprises one or more of the following:
  (i) a location sensor (not shown) for determining the location of responsive object 111 such as through the use of GPS-related signals;
  (ii) a temperature sensor (not shown) for detecting the ambient temperature in the proximity of responsive object 111;
  (iii) a humidity sensor (not shown) for detecting the ambient humidity in the proximity of responsive object 111;
  (iv) hardware and software (not shown) that is capable of responding to an inquiry about the state of responsive object 111 with information from the location sensor, the humidity sensor, and/or the temperature sensor.

In accordance with the illustrative embodiment, the transaction request is formatted in accordance with a first protocol. It will be clear to those skilled in the art how to make and use responsive object 111.

As those who are skilled in the art will appreciate, in some alternative embodiments, a second responsive object can be present, either within vehicle 101 or within another vehicle. If this is the case second responsive object is capable of receiving an inquiry as well, which inquiry can be formatted in accordance with a second protocol that is different from the first protocol. However, will be clear to those skilled in the art, after reading this disclosure, how to make and use other alternative embodiments of the present invention in which the first protocol and the second protocol are the same.

Proxy 121 comprises hardware and software that detects and responds to inquiries directed to responsive object 111. The proxy is also capable of determining its geo-location, including is situations when responsive object 111 is incapable of determining its own geo-location. For example, electromagnetic signals from one or more GPS satellites might be significantly attenuated or distorted by the time that they reach object 111 inside the vehicle, such that the object is incapable of processing the signals. Proxy 121 also receives input from responsive object sensor 131, location sensor 141, humidity sensor 142, and temperature sensor 143, which are described below. In accordance with the illustrative embodiment, proxy 121 is capable of responding to inquiries directed to responsive object 111 in accordance with the first protocol. In some embodiments, the proxy is also capable of responding to inquiries direct to other responsive objects in accordance with the first protocol or other protocols.

Responsive object sensor 131 comprises hardware and software for detecting the presence or absence of responsive object 111 within vehicle 101. In accordance with the illustrative embodiment, responsive object sensor 131 comprises a single housing, but it will be clear to those skilled in the art how to make and use alternative embodiments of the present invention in which responsive object sensor 131 comprises multiple housings. Furthermore, in accordance with the illustrative embodiment, responsive object sensor 131 uses radio-frequency identification ("RFID") technology in well-known fashion. However, it will be clear to those skilled in the art, after reading this disclosure, how to make and use alternative embodiments of the present invention in which responsive object sensor 131 uses something else such as, but not limited to, an optical bar code system. In accordance with the illustrative embodiment, responsive object sensor 131 is located within vehicle 101, but it will be clear to those skilled in the art, after reading this disclosure, how to make and use alternative embodiments of the present invention in which responsive object sensor 131 is located external to vehicle 101. It will be clear to those skilled in the art how to make and use responsive object sensor 131.

Location sensor 141 comprises a Global Positioning System receiver for detecting the geographic location of vehicle 101. Location sensor 141 acts as a substitute for the location sensor within responsive object 111. In accordance with the illustrative embodiment location sensor 141 is capable of detecting the latitude, longitude, and/or altitude of vehicle 101. Although location sensor 141 is a satellite positioning system receiver, it will be clear to those skilled in the art how to make and use alternative embodiments of the present invention in which location sensor 141 uses another technology such as, while not being limited to, network-based location systems based on triangulation and trilaterialization. It will be clear to those skilled in the art how to make and use location sensor 141.

Humidity sensor 142 comprises hardware for measuring the humidity inside and/or external to vehicle 101. Humidity sensor 142 acts as a substitute for the humidity sensor within responsive object 111. Although humidity sensor 142 is depicted in FIG. 1 as comprising a single housing within vehicle 101, it will be clear to those skilled in the art, after reading this disclosure, how to make and use alternative embodiments of the present invention in which humidity sensor 142 is external to vehicle 101. Furthermore, it will be clear to those skilled in the art, after reading this disclosure, how to make and use alternative embodiments of the present invention in which humidity sensor 142 comprises a plurality of housings. And still furthermore, it will be clear to those skilled in the art, after reading this disclosure, how to make and use alternative embodiments of the present invention in which humidity sensor 142 comprises a connection to a weather reporting service such as http://www.weather.gov.

Temperature sensor 143 comprises hardware for measuring the temperature inside and/or external to vehicle 101. Temperature sensor 142 acts as a substitute for the temperature sensors within responsive object 111. Although temperature sensor 143 is depicted in FIG. 1 as comprising a single housing within vehicle 101, it will be clear to those skilled in the art, after reading this disclosure, how to make and use alternative embodiments of the present invention in which temperature sensor 143 is external to vehicle 101. Furthermore, it will be clear to those skilled in the art, after reading this disclosure, how to make and use alternative embodiments of the present invention in which temperature sensor 143 comprises a plurality of housings. And still furthermore, it will be clear to those skilled in the art, after reading this disclosure, how to make and use alternative embodiments of the present invention in which temperature sensor 143 comprises a connection to a weather reporting service such as http://www.weather.gov.

Transaction terminal 151 comprises hardware and software for the requesting and completion of transactions, such as purchases and banking transactions. More specifically, transaction terminal 151 comprises:

i. a temperature sensor (not shown) for detecting the temperature of transaction terminal 151;
 ii. a humidity sensor (not shown) for detecting the ambient humidity in the proximity of transaction terminal 151; and
 iii. hardware and software (not shown) that is capable of responding to an inquiry about the state of transaction terminal 151 with information from the humidity sensor and the temperature sensor.

In accordance with the illustrative embodiment of the present invention, transaction terminal 151 is a toll booth, but it will be clear to those skilled in the art, after reading this specification that transaction terminal 151 can be an automatic teller machine (ATM), point of sale (POS) terminal, and so forth. Furthermore, in accordance with the illustrative embodiment, transaction terminal comprises a temperature sensor and a humidity sensor, but it will be clear to those skilled in the art how to devise alternative embodiments of the present invention where transaction terminal 151 comprises additional or different sensors, such as and not limited to, location sensors, barometric sensors, light sensors, gravimetric sensors, and so forth. In any case it will be clear to those skilled in the art how to make and use transaction terminal 151.

Transaction validator 161 is a querying device that comprises hardware and software for authenticating and authorizing transaction requests. Additionally transaction validator 161 has a means for acquiring the geo-location of terminal 151 from the terminal, from an operator, or from somewhere else.

In accordance with the illustrative embodiment and as depicted in FIG. 1, transaction terminal 151 and transaction validator 161 are located in separate housings, but it will be clear to those skilled in the art that transaction terminal 151 and transaction validator 161 can be contained inside the same housing. And still furthermore, FIG. 1 depicts proxy 121 and transaction validator 161 as located in separate housings, but it will be clear to those skilled in the art, after reading this disclosure, that transaction validator 161 and proxy 121 can be contained inside the same housing.

Figure 2:
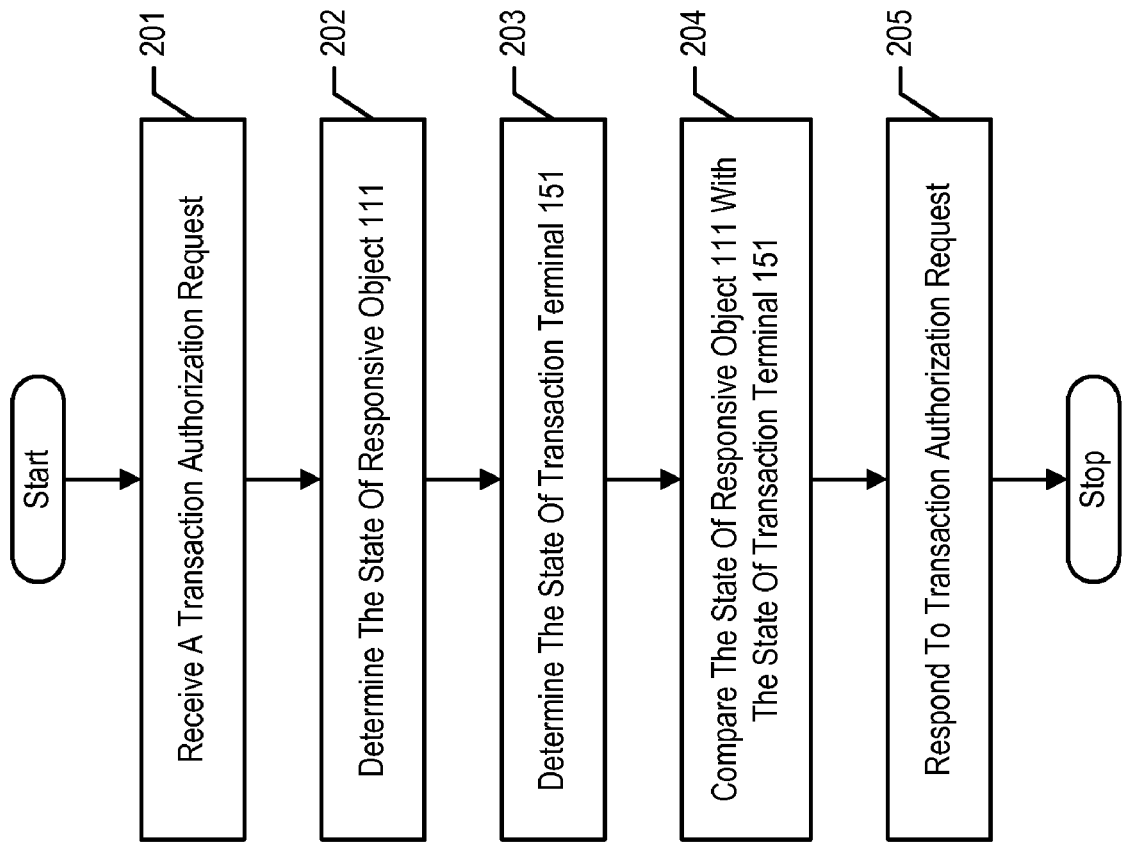
FIG. 2 depicts the salient tasks associated with the operation of the illustrative embodiment of the present invention.

FIG. 2 depicts the salient tasks associated with the operation of the illustrative embodiment of the present invention.

At task 201, transaction validator 161 receives a request from transaction terminal 151 to authorize a transaction initiated at transaction terminal 151. In accordance with the illustrative embodiment, the request originates from transaction terminal 151, but it will be clear to those skilled in the art, after reading this specification, how to devise alternative embodiments where the request is made by responsive object 111 or by another device.

At task 202, transaction validator 161 determines the state of responsive object 111 by making an inquiry to responsive object 111. In accordance with the illustrative embodiment, transaction validator 161 determines the state of responsive object 111, but it will be clear to those skilled in the art, after reading this specification, how to define alternative embodiments in which validator 161 determines the state of one or more other responsive objects as well. In accordance with the illustrative embodiment, the inquiry is directed to responsive object 111, but it will be clear to those skilled in the art, how to devise alternative embodiments where the inquiry is directed to one or more other responsive objects. And in accordance with illustrative embodiment, the inquiry is formatted according to the first protocol as recognized by responsive object 111, but it would be will be clear to those skilled in the art, that the inquiry can be formatted according to a different protocol recognized by another responsive object. The salient tasks associated with detecting the state of responsive object 111 are further described in the discussion with respect to FIG. 3.

As is described below and with respect to FIG. 3, it is proxy 121 from which the state information representing object 111 is received in accordance with the illustrative embodiment. However, in some alternative embodiments, the state information is received from something other than proxy 121.

At task 203, transaction validator 161 obtains information about the state of transaction terminal 151. In accordance, with the illustrative embodiment, the information is received by transaction validator 161 following a request made by transaction validator 161 to transaction terminal 151, but it will be clear to those skilled in the art, after reading the specification, that the information of the state of transaction terminal 151 can be transmitted simultaneously or concurrently with the making of the transaction authorization request.

At task 204, transaction validator 161 authenticates the responsive object by comparing the state of transaction terminal 151 with the state of responsive object 111 as determined and provided by proxy 121. If the two states compare favorably (e.g., are identical, are close as specified by a predetermined criterion, etc.), the transaction authorization request is approved. As those who are skilled in the art will appreciate, the transaction authorization request can approved based on something other than comparing the states received from proxy 121 and terminal 151, such as comparing the state received from proxy 121 against a threshold or another criterion independent of terminal 151.

At task 205, transaction validator 161 transmits its response to the transaction authorization request to transaction terminal 151.

Figure 3:
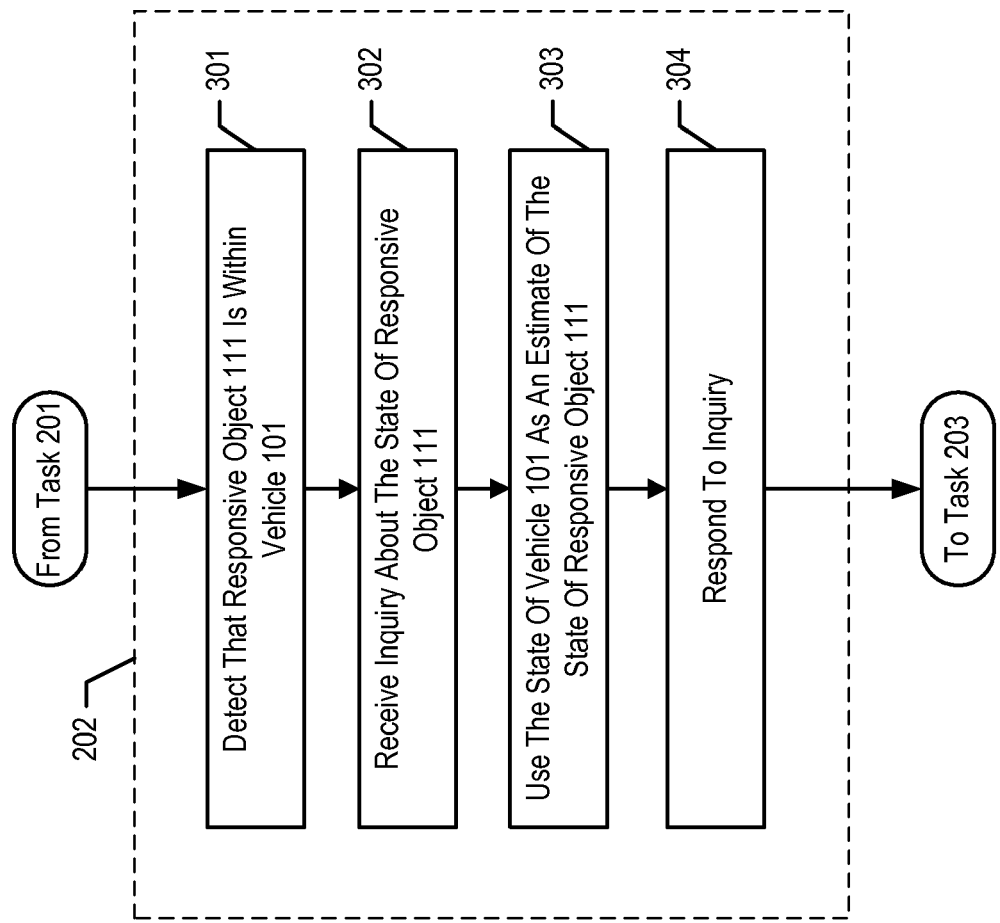
FIG. 3 depicts the salient tasks associated with the performance of task 202 depicted in FIG. 2.

FIG. 3 depicts the salient tasks associated with the performance of task 202 of the illustrative embodiment in which the state of responsive object 111 is determined by transaction validator 161. While FIG. 3 depicts the salient tasks associated with the determination of the state of responsive object 111 only, the same method can apply to the determination of the state of another responsive object.

At task 301, object sensor 131 detects the presence of responsive object 111 within vehicle 101. The detection might indicate that responsive object 111 is incapable of responding to inquiries, or the lack of capability might be determined through other means. It will be clear to those skilled in the art how to make and use embodiments of the present invention that accomplish task 301.

At task 302, proxy 121 intercepts an inquiry directed to responsive object 111, regarding a state of responsive object 111, and in accordance with a first protocol. In accordance with the illustrative embodiment of the present invention, the inquiry is received by proxy 121 via wireless telecommunications. In accordance with the illustrative embodiment, proxy 121 intercepts an inquiry directed to responsive object 111, but it will be clear to those skilled in the art how to devise alternative embodiments where proxy 121 intercepts an inquiry directed to another responsive object as well.

At task 303, proxy 121 estimates the state of responsive object 111, which state is presumably unavailable, from the state of vehicle 101. For example, if the inquiry to responsive object 111 requests the location of responsive object 111, proxy 121 uses location sensor 141 to determine the geo-location of the vehicle, and then responds to the inquiry by providing the geo-location as determined by sensor 141. Similarly, proxy 121 can use humidity sensor 142 and temperature sensor 143 to determine the humidity and temperature at the vehicle, respectively. It will be clear to those skilled in the art, after reading this specification, how to make and use alternative embodiments in which proxy 121 estimates other state information of object 111 by determining the corresponding state information of vehicle 101.

At task 304, proxy 121 responds to the inquiry of responsive object 111 with the state of vehicle 101 and in accordance with the first protocol. For example, if the inquiry to responsive object 111 requests the location of responsive object 111, proxy 121 responds with the location of vehicle 101, as measured by location sensor 141. In accordance with the illustrative embodiment, proxy 121 responds to an inquiry about the state of responsive object 111, but it will be clear to those skilled in the art how to devise alternative embodiments where the proxy responds to an inquiry about the state of another responsive object (e.g., within vehicle 101, in another vehicle, etc.). In accordance with the illustrative embodiment, the operation of proxy 121 is invisible to transmitter of the inquiry (e.g., validator 161, etc.), but it will be clear to those skilled in the art, after reading this disclosure, how to make and use alternative embodiments of the present invention in which the operation of proxy 121 is made known to the transmitter of the inquiry.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising:
a first responsive object that is capable of determining its geo-location and of responding to a first inquiry by providing a first location datum that represents the geo-location determined;
a first sensor for detecting when the first responsive object is within a predetermined vehicle;
a second sensor for sensing the geo-location of the predetermined vehicle; and
a proxy for responding to the first inquiry when the first responsive object is detected as being within the predetermined vehicle, wherein the proxy responds to the first inquiry by providing the first location datum, and wherein the value of the first location datum is based on the geo-location of the predetermined vehicle.

2. The system in claim 1 further comprising a second sensor for sensing a state of the predetermined vehicle;
wherein the value of the first location datum is also based on the state of the predetermined vehicle.

3. The system in claim 2 further comprising a third sensor for sensing an environmental condition at the predetermined vehicle;
wherein the state of the predetermined vehicle is also based on the environmental condition sensed.

4. The system in claim 3 wherein the environmental condition is temperature.

5. The system in claim 3 wherein the environmental condition is humidity.

6. The system of claim 1 wherein the proxy serves the predetermined vehicle only.

7. The system of claim 1 wherein the proxy serves multiple vehicles, including the predetermined vehicle.

8. The system of claim 1 further comprising:
a transaction terminal at a known geo-location; and
a transaction validator for receiving the response from the proxy and for validating the response, based on comparing the value of the first location datum received from the proxy to the value of the known geo-location of the transaction terminal.

9. A system comprising:
a transaction validator for querying a first responsive object;
a first sensor for detecting when the first responsive object is within a predetermined vehicle;
a second sensor for sensing the geo-location of the predetermined vehicle;
a proxy for responding to a first inquiry from the transaction validator when the first responsive object is detected as being within the predetermined vehicle, wherein the proxy responds by providing a first location datum, and wherein the value of the first location datum is based on the geo-location of the predetermined vehicle; and
a transaction terminal at a known geo-location;
wherein the transaction validator is also for receiving the response from the proxy and for validating the response, based on comparing the value of the first location datum received from the proxy to the value of the known geo-location of the transaction terminal.

10. The system in claim 9 further comprising a second sensor for sensing a state of the predetermined vehicle;
wherein the value of the first location datum is also based on the state of the predetermined vehicle.

11. The system in claim 10 further comprising a third sensor for sensing an environmental condition at the predetermined vehicle;
wherein the state of the predetermined vehicle is also based on the environmental condition sensed.

12. The system in claim 11 wherein the environmental condition is temperature.

13. The system in claim 11 wherein the environmental condition is humidity.

14. The system of claim 9 wherein the proxy serves the predetermined vehicle only.

15. The system of claim 9 wherein the proxy serves multiple vehicles, including the predetermined vehicle.

16. The system of claim 9 wherein the first responsive object is capable of determining its geo-location and of responding to the first inquiry.

17. A system comprising:
- a transaction validator for querying a first responsive object and a second responsive object;
- a first sensor for detecting when the first responsive object is within a predetermined vehicle;
- a second sensor for sensing the geo-location of the predetermined vehicle;
- a proxy for responding to a first inquiry from the transaction validator when the first responsive object is detected as being within the predetermined vehicle, wherein the proxy responds by providing a first location datum, and wherein the value of the first location datum is based on the geo-location of the predetermined vehicle, and wherein the proxy serves a second vehicle in addition to the predetermined vehicle, and wherein the second responsive object is within the second vehicle; and
- a transaction terminal at a known geo-location;
- wherein the transaction validator is also for receiving the response from the proxy and for validating the response, based on comparing the value of the first location datum received from the proxy to the value of the known geo-location of the transaction terminal.

18. The system in claim 17 further comprising a second sensor for sensing an environmental condition at the predetermined vehicle;
- wherein the value the first location datum of the predetermined vehicle is also based on the environmental condition sensed.

19. The system in claim 18 wherein the environmental condition is temperature.

20. The system in claim 18 wherein the environmental condition is humidity.

* * * * *